United States Patent Office 3,322,541
Patented May 30, 1967

3,322,541
LIGHT SENSITIVE COATINGS WITH TANNING PROPERTIES
Maximilian Karl Reichel, Wiesbaden-Biebrich, Germany, assignor, by mesne assignments, to Azoplate Corporation, Murray Hill, N.J.
No Drawing. Filed Sept. 24, 1964, Ser. No. 399,106
Claims priority, application Germany, Sept. 26, 1963, K 50,933
24 Claims. (Cl. 96—33)

In copending application Serial No. 179,489, filed March 13, 1962 now Patent Number 3,189,451, there is disclosed a light-sensitive coating with tanning properties containing a binding agent, one or more diazo compounds of amines having the general formula

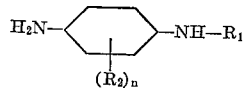

in which $R_1$ is an alkyl, an aryl, a cycloalkyl, an aralkyl or a heterocyclic group
$R_2$ is hydrogen, halogen, an alkyl group, an alkoxy group, a nitro group, or a carboxyl group and $n$ is an integer from 1 to 2; and dyestuffs and filling agents, if desired, the coating containing at least one aldehyde.

The present invention relates to a light-sensitive coating which differs from that described in the copending application in that the diazo groups of the diazo compound or compounds are stablized by the formation of a triazene with a secondary amine having the formula

in which $R_3$ and $R_4$ are identical or different alkyl, cycloalkyl, aralkyl or aryl groups, or alkylene groups which may contain carboxyl or sulfonic acid groups, if desired, and which are linked through a carbon, oxygen, sulfur or nitrogen atom to form a heterocyclic ring, which preferably has 5–7 members, and may be condensed with an aromatic nucleus.

Suitable aliphatic and cycloaliphatic amines of the above formula are, in particular, secondary amines of low molecular weight, such as dimethylamine, methylethylamine, diethylamine, di-isopropylamine, di-n-butylamine, di-n-hexylamine, di-cyclohexylamine, monomethylaminoethane-sulfonic acid, monomethylamino acetic acid, mono-n-butylamine acetic acid and mono-cyclohexylamine acetic acid; suitable araliphatic amines are methylbenzylamine and dibenzylamine; suitable aromatic amines are, in particular, mononuclear aromatic amines, such as mono-methylaniline, monoethylaniline, N-methyl-anthranilic acid, N-ethylanthranilic acid, 2-methylaminotoluene-4-sulfonic acid, and 2-ethylamino-toluene-4-sulfonic acid. The aromatic amines may also contain other substituents in their nucleus, apart from carboxyl and sulfonic acid groups, as long as the substituents remain inert under the conditions of the formation of the triazene, for example alkoxy groups or chlorine atoms; 2-methylamino-anisole and 4-chloro-monomethylaniline are other suitable substituents. The following compounds are exemplary of suitable cyclic secondary amines; pyrrolidine, pyrrolidine-2-carboxylic acid, piperidine, morpholine, thiomorpholine, piperazine, and hexamethyleneimine. The cyclic secondary amines may, in turn, have phenyl groups linked thereto by a simple bond or they may be condensed with an aromatic nucleus, preferably a benzene nucleus; 2-phenylpiperidine and benzimidazole are, for example, suitable.

Frequently, secondary amines of the above general formula which have not more than 15 carbon atoms are preferred, for reasons of solubility. Secondary amines with more than 15 carbon atoms may, however, also be used.

The triazene may be prepared in known manner from the above diazo compounds and secondary amines by a double reaction generally in a solvent. In this method of preparation, the acid formed by the hydrogen atom of the secondary amino group and the anion of the diazo compound emerges, besides the triazene. The triazene which is isolated from the reaction mixture and which has the formula

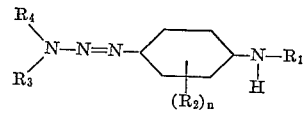

may then be added to an emulsion containing a binding agent and, if desired, dyestuffs and filling agents. It is, however, also possible to form the triazene in the emulsion by adding the two components, diazonium compound and secondary amine, separately to the emulsion. When proceeding according to this latter method, it is advisable to use a sufficiently large quantity of the amine to ensure that the acid, which is obtained in an equimolecular quantity with the triazene, is bound as an amine salt and that, furthermore, a clearly alkaline environment is ensured for the emulsion. The pH of the emulsion is preferably between 7.5 and 9.0. When using amino acids as secondary amines, it is recommended to apply the amino acid in the form of a water-soluble salt.

The light-sensitive coatings of the present invention can be employed to the same good effect as those of the copending application. However, as the diazo compounds are present in the form of the more stable triazene compounds, the coatings of the present invention have an improved shelf life, particularly if they are stored at an elevated temperature. The utility of the triazene is surprising, since they have a low sensitivity to ultraviolet light, and a good tanning effect was, consequently, not to be expected of these compounds.

The improved storability of the triazene as compared with the corresponding diazonium compound can also be utilized if it is desired to keep the diazonium salt for a prolonged time in the coating solution in the form of the triazene. This may be the case when the coating solution is to be prepared in a quantity greater than that required for presensitizing the number of printing plates or printing screens which are to be coated immediately after the preparation of the solution. Accordingly, a further object of the present invention is a solution for coating supports for the production of presensitized printing plates or printing screens, said solution containing, dissolved in water, a triazene of the kind described above and, in addition thereto, a binder and at least one aldehyde, and, if desired, dyestuffs and fillers. This solution may be used unchanged for coating, and copying material is thus obtained which contains a triazene in the light-sensitive coating. It is desired to prepare a copying material which contains in the light-sensitive layer the diazonium compound corresponding to the triazene, the coating solution is acidified shortly before application to the support by adding an acid.

The invention will be further illustrated by reference to the following specific examples:

EXAMPLE 1

A superficially saponified cellulose acetate foil is treated with a solution consisting of 1.0 part by weight (0.004 mole) of the diazonium chloride of p-aminodiphenylamine, 1.11 parts by weight (0.01 mole) of methylaminoacetic acid sodium salt and 2.0 parts by weight of a 40% solution of formaldehyde in 100.0 parts by volume of water; the excess solution is removed with the aid of a squeegee roller. After drying with warm air, the foil is exposed under a photographic negative and rinsed with running water. After normal fixing of the foil with an aqueous solution of gum arabic, or methyl cellulose or dextrine, to which a small amount of phosphoric acid has been added, the foil can be used for printing in an offset machine.

Instead of the superficially saponified cellulose acetate foil, a paper foil which has been provided with a hydrophilic surface, consisting, for example, of cellulose methyl ether, may be used with equally good results. Instead of the chloride of the diazotized p-aminodiphenylamine, the same quantity of bromide, sulfate or fluoboride may also be used with good results.

EXAMPLE 2

1.0 part by weight (0.003 mole) of the sulfate of diazotized 4-aminodiphenylamine and 1.61 parts by weight (0.01 mole) of 1-methylaminoethane-2-sulfonic acid sodium salt are dissolved in 100.0 parts by weight of a 10% solution of polyvinyl alcohol. 2.0 parts by weight of a 40% solution of formaldehyde are added at room temperature while the solution is mechanically agitated. Then, the solution is whirl-coated onto a smoothly polished copper plate. After exposure under a transparency, the portions of the coating not affected by the light are wiped off under running water, dried with warm air and the bared copper surface is etched with an aqueous solution of ferric chloride (concentration 40° Bé.≈410–415 g./l.). A printing plate suitable for intaglio printing is thus obtained. A dispersion of polyvinyl acetate in dibutyl phthalate may be added to the light-sensitive solution.

EXAMPLE 3

The procedure of Example 2 is repeated but, as a support, a copper foil is used which has a thickness of approximately 30–70μ and which has been laminated onto a plastic foil, the latter being an electrical insulator. After exposure under a photographic negative, the portion of the coating not affected by light is removed by treatment with running water, the tanned coating is dried with warm air, and the bared copper surface is etched away at room temperature with a solution of ferric chloride as employed in Example 2. A printed circuit for electric power supply is obtained.

Instead of a metal foil laminated onto an insulating plastic foil, a transparent or matted plastic foil which has been provided by vacuum deposition with a metal mirror (thickness e.g. 1μ) may also be used with equally good results. In this manner, so-called building elements for the manufacture of electrical apparatus are obtained.

Instead of 1.61 parts by weight (0.01 mole) of 1-methylaminoethane-2-sulfonic acid sodium salt, 1.37 parts by weight (0.01 mole) of pyrrolidine-2-carboxylic acid sodium salt or 1.07 parts by weight (0.01 mole) of monomethyl aniline, or 1.37 parts by weight (0.01 mole) of 2-methylaminoanisole or 2.09 parts by weight (0.01 mole) of 2-(N-ethylamino)-benzoic acid sodium salt or 2.23 parts by weight (0.01 mole) of 2-methylamino-toluene-4-sulfonic acid sodium salt or 1.18 parts by weight of benzimidazole may be used with equally good results.

EXAMPLE 4

A superficially roughened aluminium foil is whirl-coated with a solution consisting of 1.0 part by weight (0.003 mole) of the sulphate of diazotized 4-amino-diphenylamine, 0.87 part by weight (0.01 mole) of morpholine and 2.0 parts by weight of a 40% solution of formaldehyde in 100.0 parts by volume of glycolmonoethylether. After exposure under a photographic negative, the portions of the coating not affected by light are treated with a 5% solution of phosphoric acid and are thereby removed from the support. After treatment of the remaining image with greasy ink, the plate can be used in an offset printing machine.

Instead of 0.01 mole of morpholine, the same amount of piperidine or hexamethyleneimine or 0.005 mole of piperazine may be used. Instead of formaldehyde, the same amount of furfural, glyoxal, glutardialdehyde or resorcylaldehyde may be used.

EXAMPLE 5

1.0 part by weight (0.003 mole) of the sulfate of diazotized p-aminodiphenylamine, 1.11 parts by weight (0.01 mole) of methylaminoacetic acid sodium salt and 2.0 parts by weight of a 40% solution of formaldehyde are added to 100.0 parts by volume of an aqueous emulsion/dispersion consiting of polyvinylalcohol, polyvinylacetate and dibutylphthalate while the mixture is mechanically agitated. This light-sensitive emulsion/dispersion is poured into a metal or plastic container and is then applied to a fabric of poly-ε-caprolactam which is tightly clamped in a frame. The fabric is then dried with warm air and exposed under a transparency in a vacuum frame. The areas of the coating not affected by light are then removed with running water, and the fabric is again dried with warm air. A stencil for screen printing is obtained which is thoroughly hardened and which has an outstanding edge sharpness, as do the prints obtained therefrom.

Instead of 1.0 part by weight of sulfate of diazotized p-aminodiphenylamine, a mixture of 0.5 part by weight of the chloride and 0.5 part by weight of the sulfate of diazotized p-aminodiphenylamine may be used. Instead of 0.01 mole of the methylaminoacetic acid sodium salt, the same amount of methylaminoacetic acid potassium salt may be used with equally good results.

Instead of the poly-ε-caprolactam used as supporting material, other polyamides may be used, for example a commercially available fabric which is obtained by the polycondensation of adipic acid and hexamethylene diamine, as well as metal gauze, glass fiber fabric, polyester fabric, and natural or synthetic silk.

The emulsion/dispersion is prepared as follows: 100.0 parts by weight of polyvinyl alcohol are heated on a steam bath for 6–8 hours in 580 parts by volume of distilled water while being mechanically agitated. After cooling to room temperature, 100.0 parts by weight of dibutylphthalate are added while mechanically agitating the mixture and, after 15 minutes, a dispersion of 600.0 parts by weight of powdered polyvinyl acetate in 900.0 parts by volume of distilled water are stirred in.

EXAMPLE 6

The procedure of Example 5 is repeated, with the exception that an emulsion/dispersion consisting only of polyvinyl acetate and of dibutylphthalate is used instead of the emulsion/dispersion consisting of polyvinyl alcohol, polyvinyl acetate and dibutylphthalate. An excellent stencil for screen printing is obtained which has an outstanding edge sharpness, as do the prints obtained therefrom.

EXAMPLE 7

The procedure of Example 5 is repeated, but instead of the emulsion/dispersion of polyvinyl alcohol, polyvinyl acetate and dibutylphthalate, an emulsion/dispersion is used in which the polyvinyl alcohol is replaced by an 8–10% aqueous solution of epoxy resin. A very good stencil for screen printing is obtained which has an excellent edge sharpness, as do the prints.

EXAMPLE 8

The procedure of Example 5 is repeated, but instead of the emulsion/dispersion of polyvinyl alcohol, polyvinyl acetate and dibutylphthalate, an emulsion/dispersion is used in which the polyvinyl alcohol is replaced by a 10% solution of sodium-carboxymethyl cellulose. A very good stencil is obtained for screen printing which has the outstanding qualities of the stencils described in Examples 6 and 7.

Instead of 2.0 parts by weight of formaldehyde, the same quantity of furfural, acetaldehyde, chloroacetaldehyde, glyoxal, glutardialdehyde, propionaldehyde or crotonaldehyde may be used with good results.

EXAMPLE 9

The procedure of Example 5 is repeated, but instead of 2.0 parts by weight of formaldehyde, 2.0 parts by weight of cinnamaldehyde are used. A screen printing stencil is obtained which is thoroughly hardened and which has excellent edge sharpness, as do the prints. Instead of 2.0 parts by weight of cinnamaldehyde, the same quantity of pyridine-4-aldehyde resorcylaldehyde, salicylaldehyde, stilbenedialdehyde-(4,4′) or terephthaldialdehyde may be used with good results.

EXAMPLE 10

The procedure of Example 5 is repeated, but instead of 1.0 part by weight of the sulfate of diazotized p-aminodiphenylamine, 1.0 part by weight of the sulfate of 4-amino-4′-methyl-diphenylamine is used. A screen printing stencil is obtained which is thoroughly hardened and which has good edge sharpness, as do the prints obtained therefrom. Instead of 1.0 part by weight of the above diazonium sulfate, the same amount of the sulfates of 4-diazo-3′-methyldiphenylamine, 4-amino-4′-methoxy-diphenylamine, 4 - amino - 4′ - chlorodiphenylamine or 4-amino-4′-nitrodiphenylamine may be used with equally good results.

EXAMPLE 11

The procedure of Example 5 is repeated, but instead of 1.0 part by weight of the sulfate of 4-diazodiphenylamine, 1.0 part by weight of the chloride of 1-mono-ethylamino-2-methyl-4-diazobenzene is used. A screen printing stencil which is thoroughly hardened is obtained.

Instead of 1.0 part by weight of the sulfate of 1-monoethylamino-2-methyl-4-diazobenzene, 1.0 part by weight of the chloride of 1-monoethylamino-3-carboxy-4-diazobenzene, or of 1-monobutylamino-3-chloro-4-diazobenzene, or of 1 - monocyclohexylamino - 3 - methyl-4-diazobenzene may be used with equally good reults.

EXAMPLE 12

The procedure of Example 5 is repeated, but instead of 1.0 part by weight of the sulfate of 4-diazodiphenylamine, 1.0 part by weight of the chloride of 1-mono-(6-ethoxybenthiazolyl - (2) - amino - 4 - diazobenzene is used. A screen printing stencil which is thoroughly hardened is obtained.

EXAMPLE 13

1.0 part by weight (0.003 mole) of the sulfate of p-diazo-diphenylamine, 1.11 parts by weight (0.01 mole) of methylaminoacetic acid sodium salt and 2.0 parts by weight of a 40% solution of formaldehyde are added to 100.0 parts by volume of a 2% hydroxyethyl cellulose in which 10.0 parts by weight of powdered polyvinyl acetate have been dispersed; this is effected while the entire mixture is mechanically stirred. The resulting light-sensitive emulsion/dispersion is poured into a metal or plastic container and then applied onto a fabric, for example a commercially available polyamide fabric or a metal gauze, which is firmly clamped in a frame. The coated cloth is then dried at approximately 40° C. and exposed in a vacuum frame under a transparency. Then, the areas of the coating not affected by light are removed with the aid of running water and the partially decoated cloth is dried at 60°–90° C. A screen printing stencil which is thoroughly hardened and which has good edge sharpness, and therefore produces copies with good edge sharpness, is obtained.

EXAMPLE 14

The procedure of Example is repeated, but instead of an aqueous emulsion/dispersion of polyvinyl alcohol, polyvinyl acetate and dibutylphthalate, an emulsion is employed containing 15.0 parts by weight of polyvinyl alcohol dissolved in 100.0 parts by volume of water and 7.5 parts by weight of polyvinyl alcohol dispersed in the form of a powder. A screen printing stencil which is thoroughly hardened and has an excellent edge sharpness, as do the prints, is obtained.

EXAMPLE 15

The same emulsion/dispersion containing a triazene as used in Example 5 is used for coating, after having been stored for 8 weeks. Shortly before application, the emulsion/dispersion is acidified by adding 5 parts by volume of a 5% aqueous solution of phosphoric acid, thus decomposing the triazene in its components, i.e., the diazonium salt and the amine salt. Subsequently, a poly-ε-caprolactam fabric, tightly drawn over a frame, is coated with this solution. After exposure under a diapositive, the areas of the layer not affected by light are removed by rinsing with water. An excellent stencil for screen printing is thus obtained which is distinguished by outstanding marginal sharpness.

It will be obvious to those skilled in the art that many modifications may be made within the scope of the present invention without departing from the spirit thereof, and the invention includes all such modifications.

What is claimed is:

1. Light-sensitive material comprising a carrier and a colloid layer, the latter including at least one aldehyde and at least one triazene having the formula

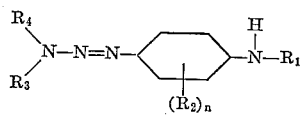

in which $R_1$ is selected from the group consisting of alkyl, aryl, aralkyl, cycloalkyl and heterocyclic groups, $R_2$ is selected from the group consisting of hydrogen, halogen, alkyl, alkoxy, nitro, and carboxyl groups, $n$ is an integer from 1 to 2, and $R_3$ and $R_4$ are selected from the group consisting of alkyl, cycloalkyl, aralkyl, aryl, and alkylene groups forming a heterocyclic ring when linked together through a member selected from the group consisting of carbon, oxygen, sulfur and nitrogen.

2. Light-sensitive material according to claim 1 in which the carrier is plastic.

3. Light-sensitive material according to claim 1 in which the carrier is paper.

4. Light-sensitive material according to claim 1 in which the carrier is metal.

5. Light-sensitive material according to claim 1 in which the carrier is a woven material.

6. Light-sensitive material according to claim 1 in which the colloid layer includes a dyestuff.

7. Light-sensitive material according to claim 1 in which the colloid layer includes a filler.

8. Light-sensitive material according to claim 1 in which the aldehyde is a lower aliphatic aldehyde.

9. Light-sensitive material according to claim 1 in which the aldehyde is an aromatic aldehyde.

10. Light-sensitive material according to claim 1 in which the aldehyde is a heterocyclic aldehyde.

11. Light-sensitive material according to claim 1 in which the aldehyde is formaldehyde.

12. A process for developing light-sensitive material which comprises exposing a supported colloid layer to a light image and removing from the support those portions of the colloid layer which were not struck by light by treatment with a solvent, the colloid layer including at least one aldehyde and at least one triazene having the formula

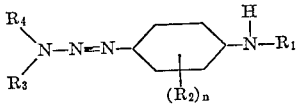

in which $R_1$ is selected from the group consisting of alkyl, aryl, aralkyl, cycloalkyl and heterocyclic groups, $R_2$ is selected from the group consisting of hydrogen, halogen, alkyl, alkoxy, nitro, and carboxyl groups, $n$ is an integer from 1 to 2, and $R_3$ and $R_4$ are selected from the group consisting of alkyl, cycloalkyl, aralkyl, aryl, and alkylene groups forming a heterocyclic ring when linked together through a member selected from the group consisting of carbon, oxygen, sulfur and nitrogen.

13. A process according to claim 12 in which the support is plastic.

14. A process according to claim 12 in which the support is paper.

15. A process according to claim 12 in which the support is metal.

16. A process according to claim 12 in which the support is a woven material.

17. A process according to claim 12 in which the colloid layer includes a dyestuff.

18. A process according to claim 12 in which the colloid layer includes a filler.

19. A process according to claim 12 in which the aldehyde is a lower aliphatic aldehyde.

20. A process according to claim 12 in which the aldehyde is an aromatic aldehyde.

21. A process according to claim 12 in which the aldehyde is a heterocyclic aldehyde.

22. A process according to claim 12 in which the aldehyde is formaldehyde.

23. A process according to claim 12 in which the solvent is water.

24. An aqueous solution for coating a light-sensitive layer onto a carrier, comprising a colloid, an aldehyde and a triazene having the formula

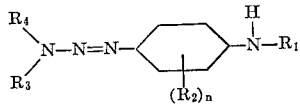

in which $R_1$ is selected from the group consisting of alkyl, aryl, aralkyl, cycloalkyl and heterocyclic groups, $R_2$ is selected from the group consisting of hydrogen, halogen, alkyl, alkoxy, nitro, and carboxyl groups, $n$ is an integer from 1 to 2, and $R_3$ and $R_4$ are selected from the group consisting of alkyl, cycloalkyl, aralkyl, aryl, and alkylene groups forming a heterocyclic ring when linked together through a member selected from the group consisting of carbon, oxygen, sulfur and nitrogen.

References Cited

UNITED STATES PATENTS

| 2,667,415 | 1/1954 | Neugebauer et al. | 96—91 X |
| 2,687,958 | 8/1954 | Neugebauer | 96—91 |
| 2,690,968 | 10/1954 | Powers | 96—49 |
| 2,937,085 | 5/1960 | Seven et al. | 96—91 X |
| 2,948,610 | 8/1960 | Merrill et al. | 96—33 |
| 2,976,152 | 3/1961 | Levine | 96—111 |
| 3,002,003 | 9/1961 | Merrill et al. | 96—33 X |
| 3,012,886 | 12/1961 | Lerner | 96—111 |
| 3,092,494 | 6/1963 | Sus et al. | 96—33 |
| 3,130,051 | 4/1964 | Herrick et al. | 96—91 X |
| 3,189,451 | 6/1965 | Reichel | 96—75 X |

OTHER REFERENCES

Grant, Julius, Hack's Chemical Dictionary, McGraw-Hill Book Co., New York 1944 (p. 865 cited).

NORMAN G. TORCHIN, *Primary Examiner.*

ALEXANDER D. RICCI, *Examiner.*

C. L. BOWERS, JR., *Assistant Examiner.*